United States Patent [19]

Takahashi et al.

[11] Patent Number: 5,794,198
[45] Date of Patent: Aug. 11, 1998

[54] PATTERN RECOGNITION METHOD

[75] Inventors: Satoshi Takahashi, Yokohama; Shigeki Sagayama, Hoya, both of Japan

[73] Assignee: Nippon Telegraph and Telephone Corporation, Tokyo, Japan

[21] Appl. No.: 547,544

[22] Filed: Oct. 24, 1995

[30] Foreign Application Priority Data

Oct. 28, 1994 [JP] Japan .................. 6-265394
Mar. 13, 1995 [JP] Japan .................. 7-052391

[51] Int. Cl.⁶ ............................................ G10L 5/04
[52] U.S. Cl. ................................. 704/256; 704/240
[58] Field of Search ....................... 395/2.65, 2.41, 395/2.4, 2.63, 2.49, 2.48; 704/256, 232, 231, 254, 240, 239

[56] References Cited

U.S. PATENT DOCUMENTS

| | | | |
|---|---|---|---|
| 4,783,804 | 11/1988 | Juang et al. | 395/2.54 |
| 5,289,562 | 2/1994 | Mizuta et al. | 395/2.09 |
| 5,390,278 | 2/1995 | Gupta et al. | 395/2.52 |
| 5,459,815 | 10/1995 | Aikawa et al. | 395/2.63 |
| 5,649,056 | 7/1997 | Nitta | 395/2.65 |

FOREIGN PATENT DOCUMENTS

| | | | |
|---|---|---|---|
| 0 533 491 | 3/1993 | European Pat. Off. | G10L 5/06 |
| 0 560 378 | 9/1993 | European Pat. Off. | G10L 5/06 |

*Primary Examiner*—Richemond Dorvil
*Attorney, Agent, or Firm*—Pollock, Vande Sande & Priddy

[57] ABSTRACT

One-dimensional normal distributions in respective dimensions of a continuous multi-dimensional normal distribution of each state of HMMs representing speech units mean and variance values are tied among similar one-dimensional distributions. As a result, the total number of normal distributions for representing the model is reduced without degrading recognition performance.

15 Claims, 10 Drawing Sheets

FIG.6A

| $I_1$ | $I_2$ | $I_3$ | $I_4$ | $I_5$ | $I_6$ | $I_7$ |
|---|---|---|---|---|---|---|
| $\mu_{a,1}$ | $\mu_{a,3}$ | $\mu_{a,4}$ | $\mu_{b,1}$ | $\mu_{b,3}$ | $\mu_{b,4}$ | $\mu_{c,2}$ |

FIG.6B

| $I_1$ | $I_2$ | $I_3$ | $I_4$ | $I_5$ | $I_6$ | $I_7$ |
|---|---|---|---|---|---|---|
| -1 | -1 | -1 | -1 | -1 | -1 | -1 |

FIG.7

| MODEL | NUMBER OF | | | | AVERAGE RECOGNITION RATE [%] |
|---|---|---|---|---|---|
| | STATES | MIXTURES | DISTRIBUTIONS | MEAN CLUSTERS | |
| CONTEXT-INDEPENDENT | 26×3 | 16 | 1248 | 1248 | 84.4 |
| 2-LEVEL MODEL | 600 | 4 | 2400 | 2400 | 87.6 |
| 3-LEVEL MODEL | 600 | 4 | 1600 | 1600 | 86.8 |
| 4-LEVEL MODEL | 600 | 4 | 1600 | 256 | 86.9 |
| 4-LEVEL MODEL | 600 | 4 | 1600 | 64 | 86.9 |
| 4-LEVEL MODEL | 600 | 4 | 1600 | 16 | 86.6 |
| 4-LEVEL MODEL | 600 | 4 | 1600 | 4 | 84.0 |

| MODEL | OCCURRENCE OF CALCULATION OF $(x_{l,i} - \mu_{k,i})^2$ | WORD RECOGNITION RATE [%] |
|---|---|---|
| 2-LEVEL MODEL (2400 MEANS) | 1.0 | 94.0 |
| 4-LEVEL MODEL (16 MEAN CLUSTERS) | 0.009 | 93.5 |

FIG. 10A

| $I_1$ | $I_2$ | $I_3$ | $I_4$ | $I_5$ | $I_6$ | $I_7$ |
|---|---|---|---|---|---|---|
| $N(\mu^A_{1,1}, \sigma^A_{1,1})$ | $N(\mu^A_{1,3}, \sigma^A_{1,3})$ | $N(\mu^A_{1,4}, \sigma^A_{1,4})$ | $N(\mu^B_{1,1}, \sigma^B_{1,1})$ | $N(\mu^B_{1,3}, \sigma^B_{1,3})$ | $N(\mu^B_{1,4}, \sigma^B_{1,4})$ | $N(\mu^C_{1,2}, \sigma^C_{1,2})$ |

FIG. 10B

| $I_1$ | $I_2$ | $I_3$ | $I_4$ | $I_5$ | $I_6$ | $I_7$ |
|---|---|---|---|---|---|---|
| -1 | -1 | -1 | -1 | -1 | -1 | -1 |

FIG.12

| MODEL | STATES | MIXTURES | NUMBER OF | | | AVERAGE RECOGNITION RATE | | AVERAGE COMPUTATION TIME RATE |
|---|---|---|---|---|---|---|---|---|
| | | | ALL DISTRIBUTIONS | DISTRIBUTIONS IN DIMENSION | ALL PARAMETER | PHONEME [%] | WORD [%] | |
| CONTEXT-INDEPENDENT | 78 | 2 | 156 | 156 | 10452 | 78.4 | 77.5 | 0.17 |
| 2-LEVEL MODEL | 450 | 2 | 900 | 900 | 60300 | 87.7 | 90.0 | 1.00 |
| | | 1 | 450 | 450 | 30150 | 86.0 | 86.0 | 0.49 |
| 3-LEVEL MODEL | | | 700 | 700 | 46900 | 87.6 | 90.0 | 0.31 |
| | | | | 256 | 17152 | 84.7 | 87.5 | 0.35 |
| | | 2 | | 64 | 4288 | 77.2 | 77.0 | 0.16 |
| 4-LEVEL MODEL | | | 700 | 256 | 17596 | 87.6 | 90.0 | 0.70 |
| | | | | 64 | 4924 | 86.4 | 89.3 | 0.48 |
| | | | | 16 | 1756 | 84.2 | 88.5 | 0.43 |

5,794,198

PATTERN RECOGNITION METHOD

BACKGROUND OF THE INVENTION

The present invention relates to a pattern recognition method which uses an HMM (Hidden Markov Model) technique and calculates the likelihood of each HMM model for an input vector to recognize it.

The HMM technique, which models data to be recognized on the basis of theories of probability and statistics, is a useful technique for speech, character, graphics and similar pattern recognition. To facilitate a better understanding of the present invention, a description will be given first of a conventional method for speech recognition through the use of the HMM technique.

In traditional speech recognition equipment, the method of modeling speech to be recognized by the HMM technique provides efficient performance and hence is in the mainstream at present. FIG. 1 shows, by way of example, the configuration of conventional speech recognition equipment which employs the HMM technique. Speech inputted via an input terminal 11 is converted into a digital signal in an A/D converting part 12. The digital signal is fed to a speech feature parameter extracting part 13, wherein speech feature parameters are extracted from the digital signal. The thus extracted speech feature parameters are LPC cepstrum coefficients, delta cepstrum coefficients, delta power, FFT cepstrum coefficients, Mel-cepstrum coefficients and a channel output value of a filter bank. HMMs, which have been prepared beforehand for each speech unit or category (e.g., a phoneme, syllable, or word) to be recognized, are read out from an HMM parameter memory 14 and inputted into a model likelihood calculating part 15, wherein the likelihood of each model is calculated for the inputted speech. A speech unit or category that is the model of the maximum likelihood is provided as the result of recognition from a recognition result outputting part 16.

FIG. 2A shows an example of a three-state (S1, S2, S3) HMM. Such a model as shown is produced for each speech unit (or category). The states S1, S2 and S3 are represented by statistical distributions D1, D2 and D3 of speech feature parameters, respectively. Provided that this model is a phoneme model, the distribution D1 of the first state S1, the distribution D2 of the second state S2 and the distribution D3 of the third state S3 represent statistical distributions of feature parameters in the vicinities of the beginning, center and end of the phoneme model, respectively.

Because of its complexity in shape, the feature parameter distribution of each state is in may cases represented using a plurality of continuous probability distributions (hereinafter referred to as mixture continuous distributions). A variety of continuous probability distributions are usable, but in many instances normal distributions are employed. In most cases, the normal distributions are each represented in the form of a multi-dimensional uncorrelated normal distribution with dimensions of the same number as that of feature parameters. In FIG. 2B there is depicted an example of the mixture continuous distribution. The mixture continuous distribution, identified by 17, is shown to be represented by three distributions, that is, a normal distribution $N(\mu_1, \sigma_1)$ 18 which has a mean vector $\mu_1$ and variance $\sigma_1$, a normal distribution $N(\mu_2, \sigma_2)$ 19 which has a mean vector $\mu_2$ and a variance $\sigma_2$, and a normal distribution $N(\mu_3, \sigma_3)$ 20 which has a mean vector $\mu_3$ and a variance $\sigma_3$. The output probability $b_s(X_t)$ of the mixture continuous distribution HMM with respect to an input feature parameter vector $X_t = (x_{t,1}, x_{t,2}, \ldots, x_{t,p})^T$ (where P is the total number of dimensions) at a time t is given by Eq. (1).

$$b_s(X_t) = \sum_{k \in k_s} W_k^s P_k^s(X_t) \tag{1}$$

where $W^s_k$ is a weighting factor for a k-th multi-dimensional normal distribution k contained in the state s. The probability density $P^s_k(X_t)$ for the multi-dimensional normal distribution k is expressed by Eq. (2).

$$P_k^s(X_t) = \frac{1}{\sqrt{(2\pi)^P |\Sigma_k^s|}} \exp\left( -\frac{(X_t - \mu_k^s)^T \Sigma_k^{s-1}(X_t - \mu_k^s)}{2} \right) \tag{2}$$

where $\mu^s_k$ represents a mean vector of the k-th multi-dimensional normal distribution and $\Sigma^s_k$ a covariance matrix of the k-th multi-dimensional normal distribution. Assuming that the covariance matrix is composed only of diagonal elements, that is, a diagonal covariance matrix, a logarithmic value of $P^s_k$ is given by Eq. (3).

$$\log P_k^s(X_t) = \sum_{i=1}^{P} \left( -\frac{1}{2} \log 2\pi - \log \sigma_{k,i}^s - \frac{(X_{t,i} - \mu_{k,i}^s)^2}{2\sigma_{k,i}^{s2}} \right) \tag{3}$$

where $\mu^s_{k,i}$ represents an i-th order element of the mean vector of the k-th multi-dimensional normal distribution of the state s and $\sigma^s_{k,i}$ an i-th order diagonal element (a variance) of the covariance matrix of the k-th multi-dimensional normal distribution of the state s.

This calculation is done for each model in terms of the feature parameter vector of the input speech at every point in time and the result of recognition is outputted on the basis of the logarithmic likelihood calculated for each model.

To enhance the recognition performance, the representation ability of the phoneme model needs to be improved—this calls for increasing the number of model parameters. An enormous amount of data is needed to train a large number of model parameters, but in practice, only a limited amount of data can be collected, and consequently, the number of model parameters cannot be increased indiscriminately. If a model containing a large number of parameters is trained using a small amount of data, the model becomes heavily dependent on the training data and a recognition error arises even if data is only slightly different from the training data. If the number of model parameters is small, the representation ability is so poor that satisfactory recognition performance cannot be expected. Thus, the accuracy of the model or model complexity and the recognition robustness bear what is called a trade-off relationship—this poses a problem that it is necessary to represent a model of more complexity with a smaller number of model parameters.

Furthermore, in the speech recognition equipment using the HMM technique, the cost of calculation for the output probability by Eq. (2) is the highest. In a typical example of speech recognition equipment, the time consumed for this calculation accounts for 45 to 65% of the entire speech recognition processing time. Although real-time processing is important from the viewpoint of human interface as well, the processing speed at present is not fully satisfactory.

In view of the above-mentioned problems of the prior art, there has been proposed the tying of a model or part of its structure for a plurality of models. That is to say, model level tying is proposed in K-F Lee and H-W Hon, "Speaker-Independent Phone Recognition Using Hidden Markov Models," IEEE Trans. Acoust., Speech, Signal Processing, vol. ASSP-37, pp. 1641–1648, No. 11, 1989. The model level tying is to share the same model by different phoneme or contextual environments. In a triphone environment, for example, as shown in FIG. 3, triphones a/m/a, o/m/o and u/m/o are common in that preceding and succeeding phonemes have substantially the same effect on the center phoneme m, and hence they share one model $M_{m1}$ as the phoneme m. Similarly, triphones o/m/i and u/m/e share the same model $M_{m2}$ as their center phoneme m. This is intended to achieve a high recognition rate with a small number of models.

State level tying is proposed in S. Young and P. Woodland, "The use of state tying in continuous speech recognition," Eurospeech-93, pp. 2203-2206 (1993). According to this scheme, when different acoustic models have similar feature distributions that the HMM states represent, the similar states share the same state; in other words, the states having similar feature distributions are tied across different acoustic models. For example, as shown in FIG. 3, in the case where the model $M_{m1}$ of the phoneme m is composed of three states $S1_{m1}$, $S2_{m1}$ and $S3_{m1}$, the model $M_{m2}$ is composed of three states $S1_{m2}$, $S2_{m2}$ and $S3_{m2}$, the states $S1_{m1}$ and $S1_{m2}$ have similar feature distributions and the states $S2_{m1}$ and $S2_{m2}$ have similar feature distributions, the models $M_{m1}$ and $M_{m2}$ share the same state $S1_m$ in place of the states $S1_{m1}$ and $S2_{m2}$ and the same state $S2_m$ in place of the states $S2_{m1}$ and $S2_{m2}$. That is to say, as depicted in FIG. 4, the model $M_{m1}$ is expressed by the state $S1_m$-$S2_m$-$S3_{m1}$ and the model $M_{m2}$ by the state $S1_m$-$S2_m$-$S3_{m2}$. In this way, context-dependent models are represented with a smaller number of states.

Furthermore, distribution level tying is proposed in Bellegarda, D. Nahamoo, "Tied mixture continuous parameter models for large vocabulary isolated speech recognition," ICASSP-89, pp. 13-16 (1989). According to this scheme, when different states have similar distributions forming mixture continuous distributions, that is, when the different states have similar mean vectors and covariance matrices, the distributions are tied across the different states. For example, as shown in FIG. 3, in the case where the mixture continuous distribution of the state $S1_{m1}$ of the model $M_{m1}$ contains basic distributions 21 and $22_1$, the mixture continuous distribution of the state $S2_{m1}$ contains a basic distribution $22_2$, the mixture continuous distribution of the state $S3_{m1}$ contains basic distributions $22_3$ and 23 and the basic distributions $22_1$, $22_2$ and $22_3$ have substantially the same mean vectors and covariance matrices, they share the same basic distribution 22. In other words, the distribution 22 is shared by the states $S1_m$, $S2_m$ and $S3_m$. Although in FIG. 3 the distributions are each shown as a two-dimensional distribution, they are usually multi-dimensional distributions such as 30-dimensional ones. As described above, the distribution of each state is represented with a small number of basic distributions.

While in the prior art the above-mentioned tying is performed first in the model level and then in the state level or distribution level, an appreciably large number of model parameters are still needed to achieve a relatively high recognition rate.

SUMMARY OF THE INVENTION

It is therefore an object of the present invention to provide a speech recognition method which permits effective reduction of the number of parameters needed without impairing the representation ability of models and degrading their recognition performance, allows efficient training of parameters even with the same amount of data, cuts the cost of the calculation of the output probability and enables real-time processing.

According to the present invention, the total number of parameters of each HMM is reduced by tying similar parameters of distributions in each dimension across different HMMs or states. For example, similar ones of parameters (mean values or variances, or both of them) that define the normal distributions in respective dimensions forming a multi-dimensional normal probability distributions are tied.

BRIEF DESCRIPTION OF THE DRAWINGS

FIG. 6A is a diagram illustrating an example of a mean vector element-index table;

FIG. 6B is a diagram illustrating an example of a calculation result buffer table;

FIG. 7 is a table showing results of phoneme recognition tests of models of different levels;

FIG. 10A is a diagram showing an example of a multi-dimensional normal distribution element-index table;

FIG. 10B is a diagram illustrating an example of a calculation result buffer table;

FIG. 12 is a table showing experimental results on the recognition performance and calculation time of models of respective levels.

DESCRIPTION OF THE PREFERRED EMBODIMENTS

The basic processing steps of the speech recognition method according to the present invention are similar to steps 12–16 for the conventional speech recognition method discussed above in reference to FIG. 1. As will be explained later, the differences are that, in producing reference HMMs to be stored in the memory 14, parameters of similar distributions in each dimension of multidimensional continuous probability distributions are each tied to a common parameter of distribution, that is, replaced by a common parameter of distribution, and that in the calculation of likelihood in step 15, calculation of likelihood for those shared parameter distributions is performed for only one of them and the calculation result is employed for others to thereby reduce the amount of computation.

Figure 1:
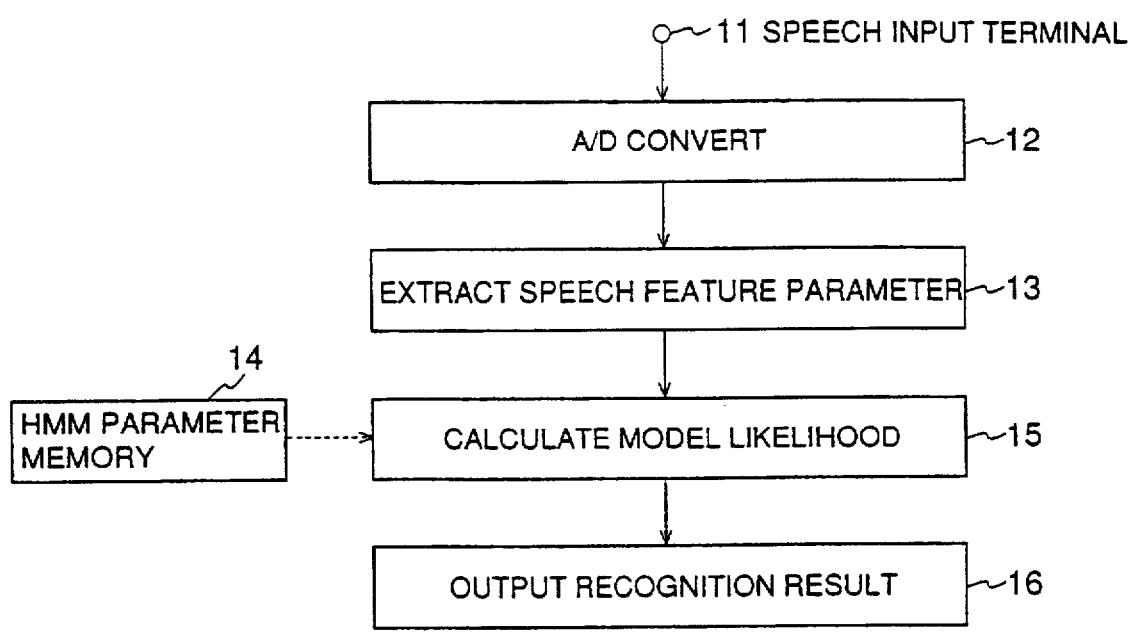
FIG. 1 is a block diagram illustrating a prior art example of speech recognition equipment using the HMM technique.
Figure 2A:
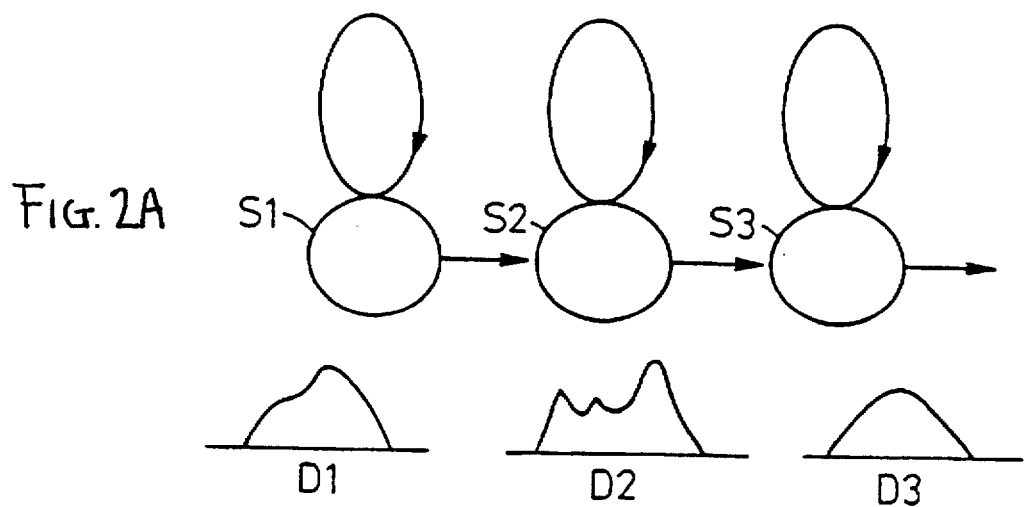
FIG. 2A is a diagram showing an example of tri-state HMM.
Figure 2B:
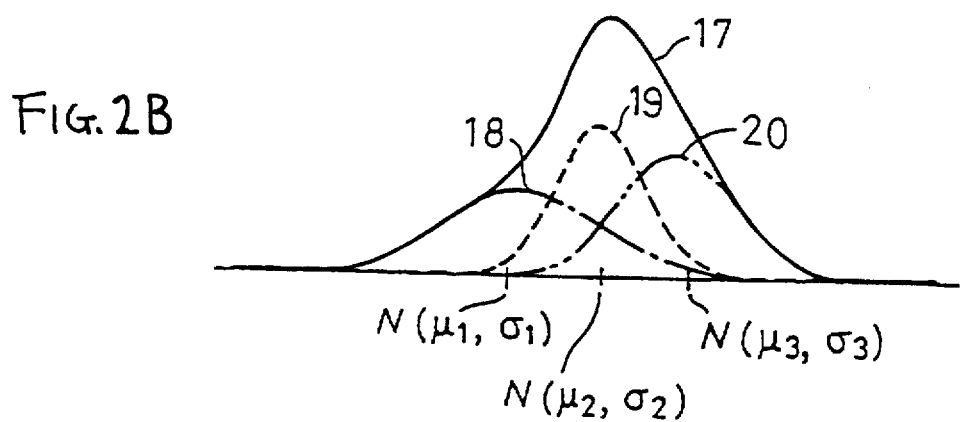
FIG. 2B is a diagram showing an example of a mixture continuous distribution.

In the following explanation of the speech recognition method according to the present invention, detailed description will be made with respect to the speech recognition processes shown in FIG. 1, particularly to the generation of HMMs to be stored in the memory 14 and to the likelihood calculation in step 15.

Figure 5:
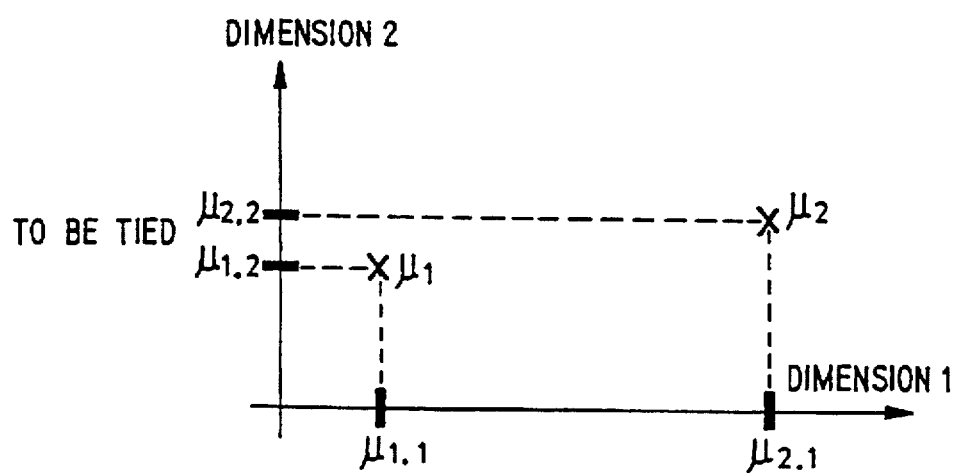
FIG. 5 is a diagram explanatory of tying mean vectors.

A description will be given first of feature parameter tying, for example, tying of mean values in respective dimensions of mean vectors. In order to implement the speech recognition method of the invention, those reference HMMs in the memory 14 (FIG. 1) to be compared with feature vectors of the input speech to be recognized are produced beforehand according to the principle of the invention. Assume two two-dimensional mean vectors $\mu_1$ ($\mu_{1,1}$, $\mu_{1,2}$) and $\mu_2$ ($\mu_{2,1}$, $\mu_{2,2}$) as shown in FIG. 5; the distance between these mean vectors $\mu_1$ and $\mu_2$ is large. Now, note elements in the respective corresponding dimensions of the mean vectors. Although the elements $\mu_{1,1}$ and $\mu_{2,1}$ in the first dimension are far apart from each other, the elements $\mu_{2,1}$ and $\mu_{2,2}$ in the second dimension are close to each other. Thus, in this embodiment, the elements $\mu_{1,2}$ and $\mu_{2,2}$ in the second dimension are tied for the mean vectors $\mu_1$ and $\mu_2$; namely, the mean vector $\mu_1$ is used as ($\mu_{1,1}$, $\mu_{c2}$) and the mean vector $\mu_2$ as ($\mu_{2,1}$, $\mu_{c2}$). The mean vectors $\mu_1$ and $\mu_2$ are far apart from each other, and hence are not tied, but their elements in the second dimension are tied as mentioned above.

Now, assume that two models A and B are present in the system and are each represented with single state and single normal distribution. Supposing that feature parameters are four-dimensional, each distribution of the models A and B is represented with mean vectors $\mu_a=(\mu_{a,1}, \mu_{a,2}, \mu_{a,3}, \mu_{a,4})$ and $\mu_b=(\mu_{b,1}, \mu_{b,2}, \mu_{b,3}, \mu_{b,4})$. When the mean values $\mu_{a,2}$ and $\mu_{b,2}$ are close to each other, they are tied and represented with a mean value $\mu_{c,2}$, and the respective mean vectors are replaced with $\mu_a=(\mu_{a,1}, \mu_{c,2}, \mu_{a,3}, \mu_{a,4})$ and $\mu_b=(\mu_{b,1}, \mu_{c,2}, \mu_{b,3}, \mu_{b,4})$, respectively. By this, the total number of parameters could be reduced from eight (four dimensions×two vectors) to seven. As a result, by such parameter sharing, it is possible to reduce the amount of data to be stored as parameters of reference HMMs in the memory 14 in FIG. 1.

Next, a description will be given of an advantage of the mean value tying in the case of calculating the likelihood of each model with respect to an input vector $X_t=(X_{t,1}, X_{t,2}, X_{t,3}, X_{t,4})$ at a time t. To calculate the likelihood of each of the models A and B, it is necessary to perform calculations $X_t$-$\mu_a$ and $X_t$-$\mu_b$ in Eq. (3). Assume that $X_t$-$\mu_a$ was calculated first. Next, $X_t$-$\mu_b$ is performed, but since the mean values in the second dimension have been tied, $x_{t,2}$-$\mu_{c,2}$ has already been calculated and need not be recalculated; that is, the result obtained in the calculation $X_t$-$\mu_a$ can be utilized. Thus, once it is calculated in any one of the models with respect to the input vector, the tied parameter need not be recalculated in other models; hence, the amount of calculation can be reduced. In the actual system, such an element parameter-index table as shown in FIG. 6A is provided, wherein indexes $I_1$ to $I_7$ are appended to respective feature parameters, i.e., respective element parameters $\mu_{a,1}, \mu_{a,3}, \mu_{a,4}, \mu_{b,1}, \mu_{b,3}, \mu_{b,4}$ and $\mu_{c,2}$ of the mean vectors $\mu_a$ and $\mu_b$, and the indexes $I_1$ to $I_7$ are used to describe the mean vectors $\mu_a$ and $\mu_b$. That is to say, $\mu_a=(I_1, I_7, I_2, I_3)$ and $\mu_b=(I_4, I_7, I_5, I_6)$, and a calculation result buffer such as shown in FIG. 6B is provided, in which the result of the calculation $(X_t i-\mu_{k,i})^2$ of each element parameter $\mu_{k,i}$ and the corresponding element $X_{t,i}$ of the input vector is stored referring to the index $I_i$ of the element parameter $\mu_{k,i}$. The calculation result buffer is initialized to −1, for example.

The calculation of the mean vector with respect to the input vector $X_t$ starts with the mean vector $\mu_a$. Since the index appended to the first element of the mean vector $\mu_a$ is $I_1$, a check is made to see if the stored contents of the calculation result buffer corresponding to the index $I_1$ is −1. If so, the element parameter $\mu_{a,1}$ is read out of the element parameter-index table of FIG. 6A, then $(X_{t,1}-\mu_{a,1})^2$ is calculated, and the calculated result is stored in the storage area of the index $I_1$ of the calculation result buffer. Also with respect to the next element parameter described as $I_7$, a similar calculation $(X_{t,2}-\mu_{c,2})^2$ is performed and its result is stored in the storage area of the index $I_7$ in the calculation result buffer. Similar processing is performed for the subsequent element parameters. The calculation of the mean vector $\mu_b$ with respect to the input vector $X_t$ uses, as the value of its second element parameter index $I_7$, the value, not −1, previously obtained with the calculation for the mean value $\mu_a$ and stored in the storage area of the index $I_7$ in the calculation result buffer.

Such sharing of calculated results by feature parameter tying can be carried out regardless of the number of models, the number of states, the number of distributions in each state and the number of dimensions of each feature parameter.

Next, a description will be given of the extent to how many parameters can be tied in the case of phoneme models in speech recognition. Now, letting the number of phonemes to be prepared in the system, the number of HMM states forming each phoneme model, the number of mixture continuous distributions contained in each state and the number of dimensions of each feature vector be represented by N, S, K and P, respectively, the total number of basic distributions (normal distributions) that the system possesses is expressed by NSK. Since each normal distribution is represented with mean vectors and covariance matrices, there exist NSK mean vectors. Since each mean vector is P-dimensional, the total number of mean values is NSKP. Now, consider tying similar ones of the NSK mean values in each dimensional p. This can be done by various methods. For example, the NSK mean values are clustered by a k-means method and the mean values belonging to the same cluster share its centroid. By clustering NSK mean values in each dimension into M, the total number of mean values can be reduced from NSKP down to MP, permitting effective representation of a phoneme model set with a small number of parameters. The number of mean vectors that can be represented with M mean values in each dimension is $M^P$—this ensures considerable representation ability. The number of parameters that are actually used in speech recognition are, for example, N=1000, S=3, K=4 and P=33. The above-mentioned M is in the range of 16 to 64. In this example, the total number of mean values can be reduced by tying from 1.3 to 5% of the number of non-tied mean values.

Speech recognition involves a speaker adaptation task which uses speech, uttered by a certain speaker, to adapt to him a speaker-independent acoustic model. In the actual speaker adaptation, the situation occasionally arises where only a small amount of speech data can be obtained for adaptation use. With a small amount of data used to train model parameters for adaptation, if the parameters are set independently for each model, the model parameters that can be adapted are limited to only those related to training data. With the tying technique according to the present invention, when only some of the model parameters are adapted, the other model parameters which share them can simultaneously be adapted.

Next, a description will be given of experiments on the tying of mean values of mean vectors according to the present invention. As will be described below, HMM tying was performed by (1) model level tying (first level), (2) state level tying (second level), (3) basic distribution level tying (third level), mentioned previously, and (4) feature parameter level tying whereby similar mean values are tied across mean vectors of different multi-dimensional normal distributions according to the present invention (four-level tying).

Step 1: To implement the first and second tying, an HMnet is generated using a State Successive Splitting (SSS) method (Takami J. and Sagayama S., "A Successive State Splitting Algorithm for Efficient Allophone Modeling," Proc. ICASSP92, pp. 573-576, 1992). Data obtained from one speaker is used to generate a 600-state HMnet in which each state is represented with a single normal distribution.

Step 2: Four Hmnets are trained with the same state-tied structure as that of the model obtained in Step 1. Then, a four-mixture HMnet is produced by overlapping the corresponding states of the four HMnets. The four-mixture HMnet is used as an initial model to perform training with data obtained from 16 speakers, generating a speaker-independent HMnet (Kosaka T., Takami J., Sagayama S., "Rapid Speaker Adaptation Using Speaker-Mixture Allophone Models Applied to Speaker-Independent Speech Recognition," Pro. ICASSP93, pp. II-570-573).

Step 3: To implement the third level tying of basic distributions, distributions in all states (4 mixtures×600 states=2400 distributions) are clustered into 1600 distributions to tie the distributions in the clusters. The metric or distance measure for clustering is the Kullback-divergence. Mean value $\mu_{m,i}$ (where i indicates the dimension) and variance $\sigma^2_{m,i}$ of the representative distribution in a cluster m are calculated as follows:

$$\mu_{m,i} = \left( \sum_{k \in m} \mu_{k,i} \right) / K \quad (4)$$

$$\sigma^2_{m,i} = \left( \sum_{k \in m} \sigma^2_{k,i} + \sum_{k \in m} \mu^2_{k,i} - K \cdot \mu^2_{m,i} \right) / K \quad (5)$$

where summations are for the distributions that belong to the cluster m (K being the total number of distributions in the cluster). Thus, the total number of distributions is reduced from 2400 to 1600, with each state holding four mixtures.

Step 4: Based on the three-level model having 1600 mean vectors, mean values are clustered into n (=256, 64, 16 and 4) in each dimension by the scalar quantization technique. The Euclidean distance is used as a metric or distance measure for the clustering. The original mean vectors are each represented by a combination of the n representative mean values. Incidentally, the clustering method used in the third and fourth levels is the k-means method, and the diagonal covariance matrices are not tied.

FIG. 7 shows the total number of distributions, the number of mean value clusters and the average phoneme recognition rate of the model of each level. In the experiments, speech data of 16 speakers was used for training and speech data of four speakers for evaluation. The performance of the two-level model was 3.2% better than that of the context-independent model. Although the three-level model was slightly inferior to the two-level model, the total number of parameters decreased by 33%. At this stage 1600 mean values exist in each dimension. These mean values were clustered to decrease the number of representative mean values to 256, 64, 16 and 4 one after another. The recognition performance did not slow down even with 16 representative mean values in each dimension. From this, it will be seen that the representative mean values in each dimension of the model contains redundant information in the prior art and that the tying of such mean values according to the present invention will permit efficient representation of the model with a small number of parameters.

Figures 8, 9:
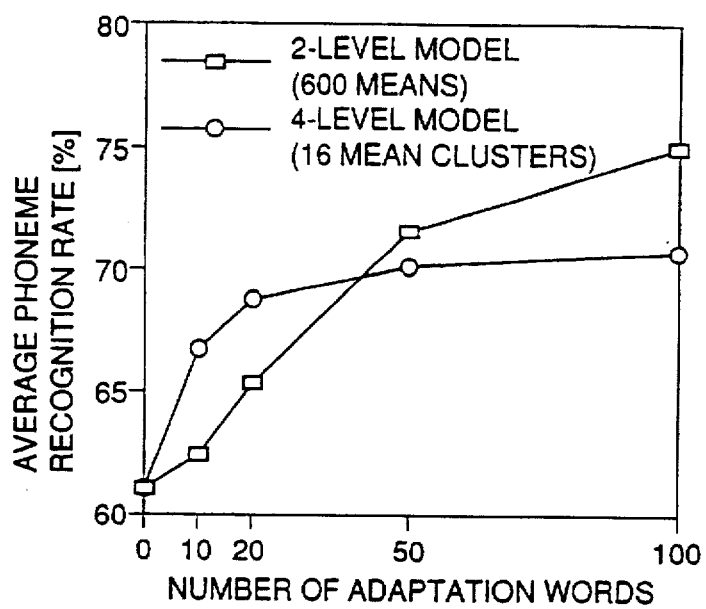
FIG. 8 is graph showing training curves in speaker adaptation.
FIG. 9 is a table showing the number of calculations involved in word recognition.

FIG. 8 is a table showing experimental results of the speaker adaptation. In this experiment, a model trained with data of one standard speaker was adapted to a new speaker with a small amount of data obtained from a new speaker. A two-level and a four-level model were compared. The two-level model contained 600 representative mean values and the four-level model had its 600 mean vectors represented with combinations of 16 representative mean values in each dimension. FIG. 8 shows the average phoneme recognition rate when increasing the number of adaptation words. In the four-level model, since each mean value was shared by a large number of mean vector elements (600/16≅38 mean vector elements on the average), many vector elements were adapted when a small number of mean vectors were moved. Hence, when the number of adaptation words is small, the recognition rate of the four-level model is higher than that of the less-tied two-level model.

FIG. 9 shows the results of comparison of the two-level model (containing 2400 mean vectors) and four-level model (containing 1600 mean vectors represented by 16 representative mean values per dimension), both produced for the experiment on phoneme recognition, in terms of word recognition rate and the amount of calculation needed for recognition. The vocabulary size used was 1000 words and 100-word sets uttered by four testing speakers were used for evaluation. The amount of calculation counted was the number of times the squaring of the difference between the input value and the mean value (the calculation of the numerator of the third term on the right-hand side of Eq. (3)) was performed during likelihood calculation. From the results shown in FIG. 9 it was confirmed that the feature parameter tying significantly reduces the amount of calculation related to mean values in the likelihood calculation.

Figure 3:
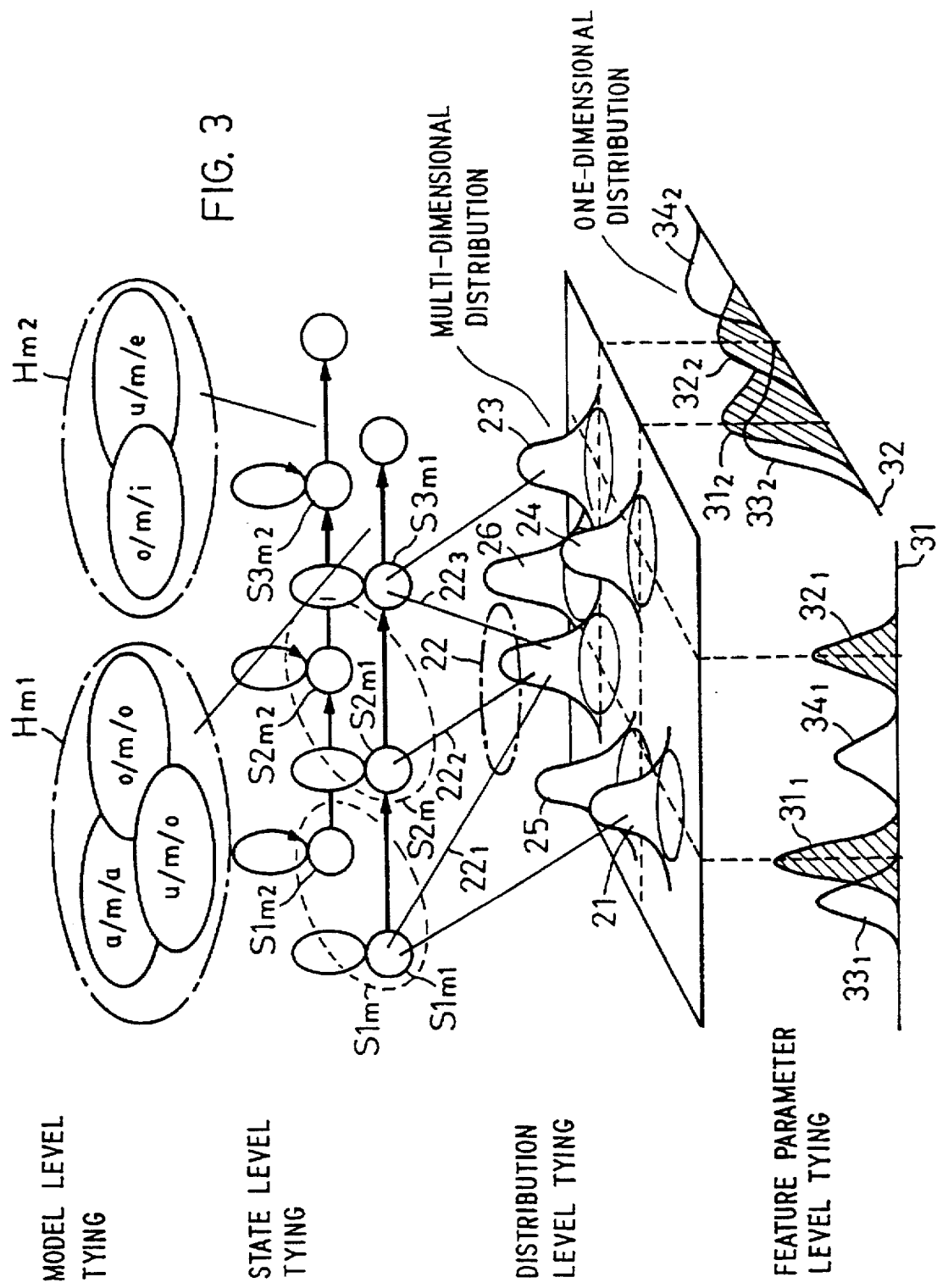
FIG. 3 is a diagram showing various tying levels and the concept of a level-tied structure model.
Figure 4:
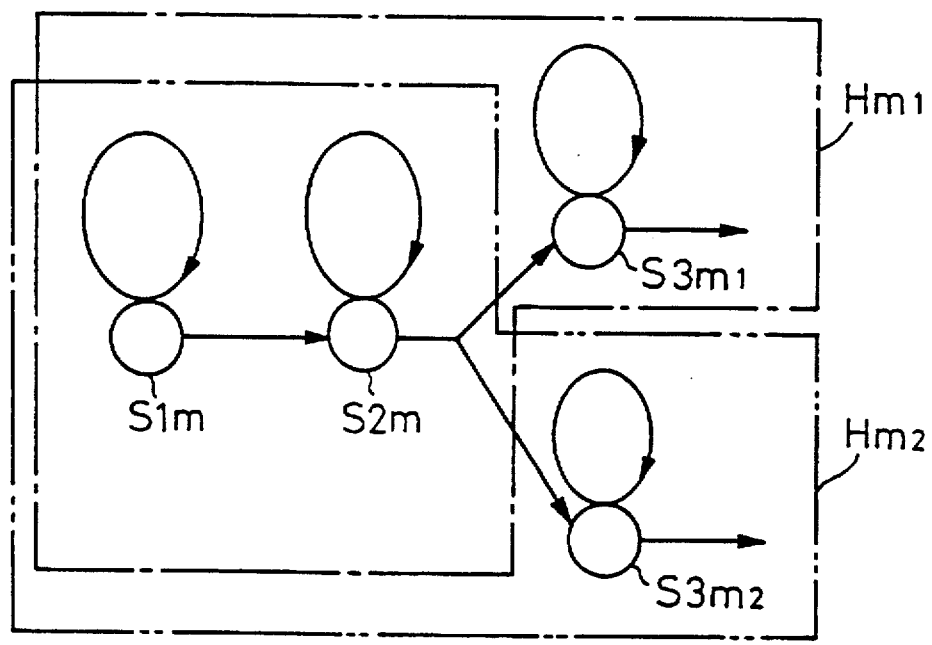
FIG. 4 is a diagram showing an example of state level tying.

Next, a description will be given of an embodiment of tying both of the mean value and the variance as feature parameter tying, that is, tying one-dimensional distributions in each dimension of the multi-dimensional continuous distribution representing the feature parameter distribution. Now, consider that, for example, in FIG. 3 the two-dimensional distributions 21, 22, 23, . . . are projected on first and second one-dimensional axes 31 and 32, respectively. Here, the projected distributions for the distributions 21 and 22 on the first dimensional axis 31 are substantially overlapped as indicated by $31_1$ and the distributions 23 and 24 are also substantially overlapped as indicated by $32_1$, but the projected distributions for the distributions 25 and 26 are appreciably displaced from the other distributions as indicated by $33_1$ and $34_1$, respectively. On the second dimensional axis 32, the distributions 24 and 25 are overlapped as indicated by $31_2$ and the distribution 22 and 23 are also overlapped as indicated by $32_2$, but the distributions 21 and 26 are significantly displaced from the other distributions as indicated by $33_2$ and $34_2$, respectively. Hence, the one-dimensional distributions $(\mu_{1,1}, \sigma_{1,1})$ and $(\mu_{2,1}, \sigma_{2,1})$ in the two-dimensional distributions 21 and 22 $\{(\mu_{1,1}, \sigma_{1,1}, \mu_{1,2}, \sigma_{1,2})$ and $(\mu_{2,1}, \sigma_{2,1}, \mu_{2,2}, \sigma_{2,1})\}$ are tied. Similarly, the one-dimensional distributions $(\mu_{3,2}, \sigma_{3,2})$ and $(\mu_{4,2}, \sigma_{4,2})$ in the two-dimensional distributions 24 and 25 $\{(\mu_{3,1}, \sigma_{3,1}, \mu_{3,2}, \sigma_{3,2})$ and $(\mu_{4,1}, \sigma_{4,1}, \mu_{4,2}, \sigma_{4,2})\}$ are tied. In this way, the one-dimensional distributions in each dimension of the multi-dimensional distribution are also tied.

Let multi-dimensional normal distributions A and B in two HMM states be represented by $N(\mu_1^A, \Sigma_1^A)$ and $N(\mu_1^B, \Sigma_1^B)$, respectively, where $N(\mu, \Sigma)$ represents a normal distribution that the mean vector is $\mu$ and that the covariance matrix is $\Sigma$. Assuming that the feature parameters are four-dimensional and that the covariance matrix is composed only of diagonal elements, the distributions can be expressed as follows:

$$N(\mu_1{}^A, \Sigma_1{}^A) = \{N(\mu_{1,1}^A, \sigma_{1,1}^A), N(\mu_{1,2}^A, \sigma_{1,2}^A), N(\mu_{1,3}^A, \sigma_{1,3}^A), N(\mu_{1,4}^A, \sigma_{1,4}^A)\}$$

$$N(\mu_1{}^B, \Sigma_1{}^B) = \{N(\mu_{1,1}^B, \sigma_{1,1}^B), N(\mu_{1,2}^B, \sigma_{1,2}^B), N(\mu_{1,3}^B, \sigma_{1,3}^B), N(\mu_{1,4}^B, \sigma_{1,4}^B)\}$$

When the normal distributions $N(\mu_{1,2}{}^A, \Sigma_{1,2}{}^A)$ and $N(\mu_{1,2}{}^B, \Sigma_{1,2}{}^B)$ of the second dimension are similar to each other, they are tied and represented by one distribution $N(\mu_{1,2}{}^C, \Sigma_{1,2}{}^C)$, and the respective multi-dimensional normal distributions are replaced as follows:

$$N(\mu_1{}^A, \Sigma_1{}^A) = \{N(\mu_{1,1}^A, \sigma_{1,1}^A), N(\mu_{1,2}^C, \sigma_{1,2}^C), N(\mu_{1,3}^A, \sigma_{1,3}^A), N(\mu_{1,4}^A, \sigma_{1,4}^A)\}$$

$$N(\mu_1{}^B, \Sigma_1{}^B) = \{N(\mu_{1,1}^B, \sigma_{1,1}^B), N(\mu_{1,2}^C, \sigma_{1,2}^C), N(\mu_{1,3}^B, \sigma_{1,3}^B), N(\mu_{1,4}^B, \sigma_{1,4}^B)\}$$

By this, the total number of parameters $\mu$ and $\sigma$ could be reduced from 16 to 14.

Next, a description will be given of an advantage which is provided by the distribution tying in each dimension in the case of calculating the likelihood with respect to an input vector $X_t=(x_{t,1}, x_{t,2}, x_{t,3}, x_{t,4})$ at the time t. The calculation of the likelihood for each model requires the calculation of Eq. (3). Assume that the likelihood of the distribution A has been first calculated. This is followed by the calculation for the distribution B, but in this case, the distributions in the second dimension are tied and hence need not be recalculated; the result of the calculation of the second-dimension distribution for the distribution A can be used. As will be appreciated from the above, once the calculation for tied parameters is performed in any one of the models involved, the calculated result can be used in other models. Hence, the amount of calculation can be reduced accordingly.

In the actual system, there is provided such an element index table as shown in FIG. 10A. That is to say, the indexes $I_1$ to $I_7$ are appended to the normal distributions $N(\mu_{1,1}{}^A, \sigma_{1,1}{}^A), N(\mu_{1,3}{}^A, \sigma_{1,3}{}^A), N(\mu_{1,4}{}^A, \sigma_{1,4}{}^A), N(\mu_{1,1}{}^B, \sigma_{1,1}{}^B), N(\mu_{1,3}{}^B, \sigma_{1,3}{}^B), N(\mu_{1,4}{}^B, \sigma_{1,4}{}^B), N(\mu_{1,2}{}^C, \sigma_{1,2}{}^C)$, and the multi-dimensional normal distributions A and B are described using the indexes $I_1$ to $I_7$ as follows: $N(\mu_1{}^A, \Sigma_1{}^A)=\{I_1, I_7, I_2, I_3\}$ and $N(\mu_1{}^B, \Sigma_1{}^B)=\{I_4, I_7, I_5, I_6\}$. Furthermore, such a calculation result buffer as shown in FIG. 10B is provided, in which the results of calculations of the distributions in each dimension for the input vector are stored referring to the element index $I_i$. The calculation result buffer is initialized to $-1$, for instance.

The calculation for the input vector $X_t=(x_{t,1}, x_{t,2}, x_{t,3}, x_{t,4})$ starts with the distribution A $(N(\mu_1{}^A, \Sigma_1{}^A))$. Since its first element index is $I_1$, a check is made to see if the content stored in the calculation result buffer (FIG. 10B) corresponding to the index $I_1$ is $-1$. If so, the parameters $\mu_{1,1}{}^A$ and $\sigma_{1,1}{}^A$ of the distribution A are read out from the element index table of FIG. 10A and the calculation result with $X_{t,1}$ is stored in the storage area of the index $I_1$ in the calculation result buffer. Similar processing is also performed for the next element index $I_7$, and the calculation result is stored in the storage area of the index $I_7$ in the calculation result buffer. Similar processing is carried out for the subsequent elements. The calculation for the distribution B utilizes, for its second index $I_7$, the result of the calculation executed for the distribution A since the storage area of the index $I_7$ in the calculation result buffer is not $-1$.

Such sharing of calculation results by the parameter tying can be carried out regardless of the number of models, the number of states, the number of distributions in each state and the number of dimensions of feature parameters.

Next, a description will be given of an example in which the distribution parameters to be tied is changed for each dimension. In the feature parameter vector of speech, each dimension has a different amount of information for discriminating phonemes. For example, a cepstrum coefficient that is one of feature parameter vectors is in many cases represented using about 16 dimensions, and elements of lower dimensions mainly contain larger amounts of information. In view of this, the number of parameters to be tied for the distributions in the lower dimensions is reduced to provide a large number of parameters, thereby improving the representation ability. On the other hand, for the distribution in the higher dimensions, the feature parameter level tying is positively performed to tie as many similar distributions as possible. With such processing, it is possible to represent the parameters more efficiently by assigning a different number of distributions for each dimension even if the total number of distributions remains unchanged. It is evident that the number of distributions need not always differ with the dimensions but may also be the same in some dimensions. In the tying of the multi-dimensional normal distributions, the respective dimensions are tied in the same tying relationship so as to tie the vectors. Consequently, the same number of distributions exist in each dimension after tying, and no matter how much information they may have, the dimensions are represented by the same number of distributions. Accordingly, even with the same number of distributions (also with the same amount of calculation), the tying method of the present invention provides a model of higher performance by increasing the number of distributions in the dimension with larger amounts of information and decreasing the number of distributions in the dimension with smaller amounts of information. In other words, a model of the same performance could be generated with a smaller number of distributions, cutting the amount of calculation.

With a statistical method like the HMM technique, the number of parameters and the amount of training data are strongly related. When a large number of distributions are contained in the model, the number of parameters to be estimated is large and a large amount of training data is needed. When the amount of training data is small, the generality of the model will be lost. The present invention effectively reduces the number of distributions while maintaining information necessary for recognition, and hence enables high recognition performance to be obtained with a small amount of training data.

Next, a description will be given of an example of an experiment. As described below, HMM tying was performed by (1) the model level tying (first level), (2) the state level tying (second level), (3) the basic distribution level tying (third level), described previously, and (4) the feature parameter level tying for tying one-dimensional normal distributions (mean value and variance) across different multi-dimensional normal distributions according to the present invention.

Step 1: To implement the first and second levels, the State Successive Splitting (SSS) method was used. Data of one speaker was used to generate a 450-state HMnet in which each state was represented with a single normal distribution.

Step 2: After the model obtained in Step 1 was subjected to two-mixture distribution processing for each state, the model was trained with data obtained from many speakers to generate a speaker-independent HMnet (a two-level tied model).

Step 3: To implement the multi-dimensional normal distribution level tying, all distributions (2 mixture×450 states= 900 distributions) were clustered into 700 distributions (In the experiment, the distributions were also clustered into 256 and 64 distributions, for reference). The distance measure between distributions i and j was defined as follows:

$$d(i,j) = \left( \frac{1}{P} \sum_{k=1}^{P} \frac{(\mu_{ik} - \mu_{jk})^2}{\sigma_{ik}\sigma_{jk}} \right)^{1/2} \quad (6)$$

where $\mu$ and $\sigma$ indicate the mean value and the variance, respectively, and P the total number of dimensions. A representative distribution in each cluster is shared by the distributions in the cluster. Accordingly, the total number of distributions is reduced from 900 to 700 with the two-mixture state held unchanged (the three-level tied model).

Step 4: In the feature parameter level tying, each dimension is represented with a different number of distributions. In this experiment, average inter-distribution distances of 900 distributions in each dimension of the model obtained in Step 2 were calculated, and based on the average distance normalized by the total average distances, the number of distributions in each dimension $m_p$ (where p indicates the dimension) was determined. The distance measure was the same as is given by Eq. (4).

Step 5: The model obtained in Step 3 was used to generate $m_p$ distribution clusters in each dimension, and the representative distributions in the respective clusters were used as tied distributions in that dimension (a four-level tied model).

Incidentally, a furthest neighbor method was used for every clustering. The three-level tied model and the four-level tied model were both retrained after the tying relation was determined.

The respective models thus obtained were evaluated in terms of recognition performance and the calculation time during recognition by experiments in phoneme recognition and word recognition. In the experiments 5240-important-Japanese word sets and 216-word sets uttered by 10 male speakers were used. Of the 10 speakers, 8 speakers were used for training and two speakers for evaluation. A 10,480-word set selected uniformly from the even-numbered words in the 5240-word sets and the 216-word sets of all training speakers were used for training models. In the phoneme recognition test, 524 words arbitrarily selected from the odd-numbered 5240-word set were used. In the word recognition test, 1500 words were arbitrarily selected from the odd-numbered 5240-word set and used as the vocabulary for recognition, and 200 words were actually recognized for evaluation. The number of phoneme categories was 26. The feature parameters were 16 cepstrum coefficients, 16 delta cepstrum coefficients and delta power (33 dimensions in total).

Figure 11:
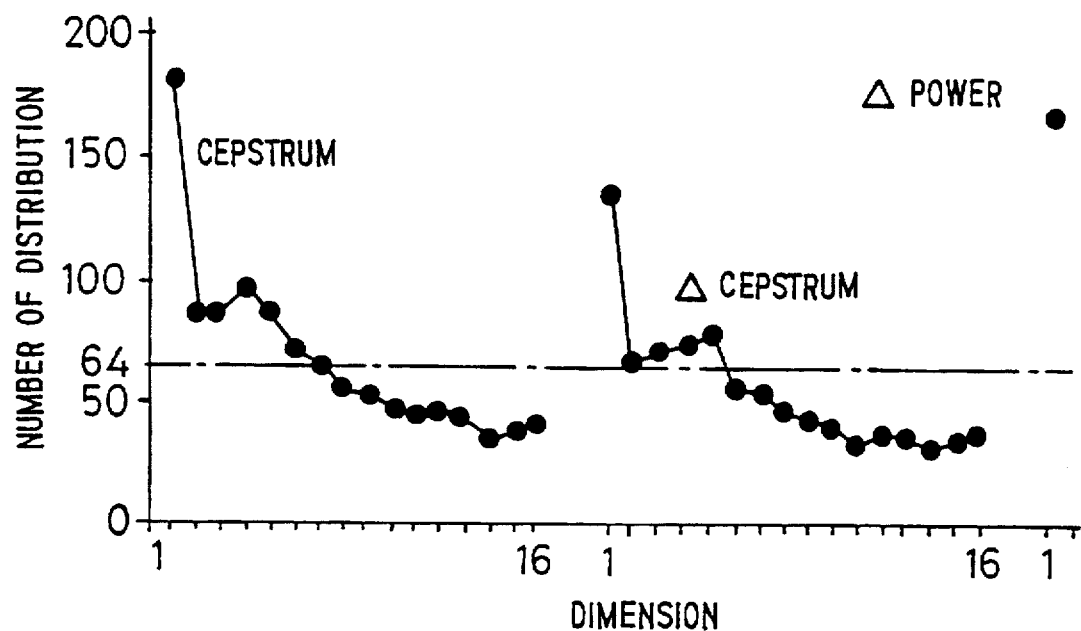
FIG. 11 is a graph showing, by way of example, the number of distributions assigned to each dimension of a feature parameter vector.

FIG. 11 is a graph showing, by way of example, the number of distributions assigned to each dimension of the feature parameter in Step 4 in the case where the number of distributions for each dimension was 64 on the average (Total: 64×33 dimensions=2112 distributions). It is seen from FIG. 11 that in both of the cepstrum coefficients and the delta cepstrum coefficients, components of lower dimensions are large in the average inter-distribution distance and are assigned a larger number of distributions. It is also evident that the number of distributions in the first to fifth dimensions may be set to 64 or more, whereas the number of distributions in the sixth and higher dimensions may be set to 64 or less.

Figure 13:
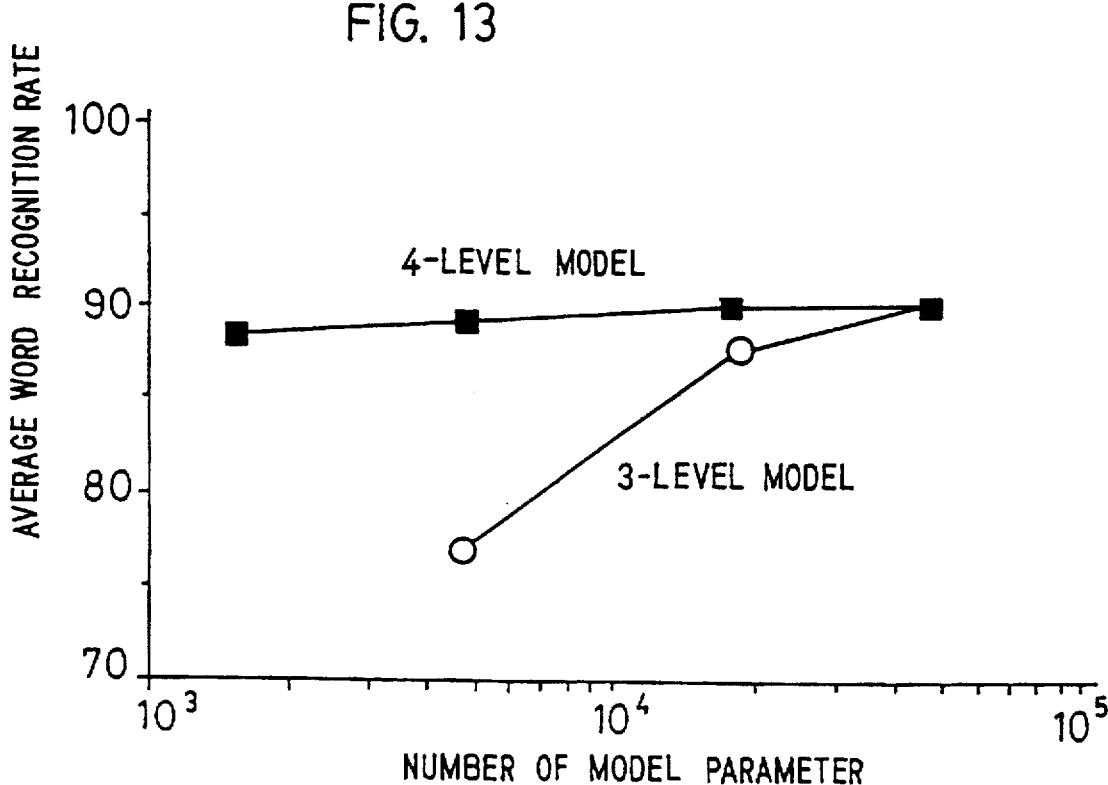
FIG. 13 is a graph showing the relationship between the total number of parameters and the word recognition rate in FIG. 12.

FIG. 12 is a table showing the configuration, average phoneme recognition rate, average word recognition rate and average computation time (CPU time) ratio of each model. The three-level model and four-level model both always keep their structure which consists of 450 states with 2 mixtures (900 distributions). In the four-level model, since each dimension is assigned a different number of distributions, the numerical values given in FIG. 12 are average numbers of distributions. In the total number of parameters, the mean value, the covariance matrix and the distribution weighting factor are taken into account. The computation time is expressed as a ratio with the CPU time needed for the output probability calculation in the word recognition of the two-level model being set at 1.0. The computer used is SUN SPARC10. For reference, the test results of a context-independent model consisting of 3 states with 2 mixtures are also shown. FIG. 13 is a graph showing the relationship between the four-level tied structure model in FIG. 12 and a conventional three-level tied structure model in terms of the total number of model parameters and the word recognition rate.

In the case of the three-level model, even if the number of basic distributions is decreased to 700, its performance, for example, the word recognition rate remains as high as 90.0% and the computation time can be reduced. However, since the tying of basic distributions is based on the assumption that the mean values and covariance are both similar in all dimensions, the reduction of the number of basic distributions down to 256 and 64 causes excessive tying for 900 distributions or lowers the degree of similarity of the distributions to be tied, with the result that the word recognition rate, for instance, drastically goes down to 87.5% and 77.0% as shown in the table of FIG. 12. In contrast to this, in the case of the four-level model according to the present invention, distributions are effectively assigned to each dimension and their combinations represent 700 basic distributions, and these basic distributions represent the 900 original distributions on the basis of the three-level model. With such tying up to the fourth level, the original distributions are efficiently represented, and even when the number of basic distributions is 256, the phoneme recognition rate and the word recognition rate are as high as 87.6 and 90.0%, respectively; these figures are the same as those obtainable with 700 distributions of the three-level model. Even with 64 distributions, the phoneme recognition rate and the word recognition rate only slightly drop to 86.4% and 89.3%, appreciably higher than in the case of 64 distributions of the three-level model, and the computation time can also be reduced. Thus, the present invention permits reduction of the number of parameters down to 1/10 to 1/15 without degrading the performance of a model which has a large number of parameters (in FIGS. 12 and 13, a model having a total of about 50,000 parameters).

The reason that such advantages can be realized is that the normal distributions are tied independently in each dimension in such a manner that the number of distributions to be tied is changed with the amount of discrimination information in the dimension as shown in FIG. 11. That is to say, larger numbers of parameters are tied in higher dimensions with smaller amounts of information to reduce the numbers of parameters that can be selected for representing distributions in those dimensions and smaller numbers of parameters are tied in lower dimensions with larger amounts of information to increase the numbers of parameters that can be selected for representing distributions in those dimensions; hence, the model can efficiently be represented with a smaller number of distributions as a whole.

In the above experiments, the feature parameter level tying according to the present invention has been described to be performed for the model subjected to the model-level, state-level and basic distribution level tying, but the feature parameter level tying may also be performed for a model subjected to the model-level and the state-level tying alone.

The HMM technique is now being widely applied to various kinds of pattern recognition as well as to speech recognition. For example, it has been proposed that HMMs generated beforehand for individual face images of persons are used to recognize or identify the face shown by an unknown input image (F. Samaria, "Face Segmentation For Identification Using Hidden Markov Models," Proceedings of 4th British Machine Vision Conference, 1993). It has also been proposed to train a sequence of images of a tennis player with HMMs for each action or scene, such as a service, volley or ground stroke, and recognize what play an unknown input image shows (J. Yamato, J. Ohya and K. Ishii, "Recognizing Human Action in Time-Sequential Images Using Hidden Markov Model," Proceedings of IEEE Conference on Computer Vision and Pattern Recognition, pp. 379–385, 1992). Furthermore, it has been proposed to train the HMM for each graphic class and determine which class an input graphic form is classified into (Y. He and A. Kundu, "Planar Shape Classification Using Hidden Markov Model," Proceedings of IEEE Conference on Computer Vision and Pattern Recognition, pp. 669–671, 1992). The present invention is applicable to all of such pattern recognition schemes employing the HMM technique.

In general, model parameters are set independently for each model and are trained using data of respective categories. By tying parameters of similar properties across different models, the tied parameters can be trained using data of the categories concerned—this means that the substantial amount of data increases.

A context-dependent acoustic model, for instance, has a large number of multi-dimensional normal distributions (1000 or more, for example), and consequently, the numbers of one-dimensional normal distributions and mean values are the same in all dimensions. For example, even when 1000 normal distributions are merged into m in each dimension, the multi-dimensional normal distributions are each represented with a combination of m one-dimensional normal distributions, so that a total of $m^P$ (P being the number of dimensions) multi-dimensional normal distributions can be represented with the m normal distributions; namely, the representation ability is still considerably high even after tying. As regards the spectral sensitivity (resolution) of the feature parameter such as cepstrum coefficients, the number of representative points for the feature parameter space need not be as large as 1000,but less than 100 points may be enough for each dimension. By tying the aforementioned mean values across different basic distributions, even if more than 1000 mean values are merged into m in each dimension, there still is the potential to represent $m^P$ vectors; thus, the representation ability after tying is appreciably high.

Next, the advantage of the tying according to the present invention will be considered in terms of the amount of calculation. Since many of the present HMMs are based on the assumption of the multi-dimensional uncorrelated normal distribution, the log likelihood is calculated as expressed by Eq. (3). Eq. (3) provides the sum of probability density values for normal distributions in each dimension, and no calculation is involved across dimensions. Accordingly, the calculation can be considered independently in each dimension. By tying the one-dimensional distributions (mean value and variance), the results for each dimension in Eq. (3) can be tied across models. By tying mean values, the results of calculation of the numerator in the braced second term on the right side of Eq. (3) can be shared by the models. Thus, the amount of calculation for recognition can be reduced.

It will be apparent that many modifications and variations may be effected without departing from the scope of the novel concepts of the present invention.

What is claimed is:

1. A speech recognition method, comprising the steps of:
   (a) Analyzing each of a plurality of sample speech patterns to obtain feature vectors;
   (b) grouping all of the feature vectors according to recognition categories;
   (c) modeling each category by a sequence of transition states each including at least one multi-dimensional continuous probability distribution of feature vectors, said modeling step including replacing each of the parameters of distributions of a group resembling one another in each dimension in the multi-dimensional continuous probability distribution by a common parameter of distribution thereby to produce a hidden Markov model of said recognition category;
   (d) analyzing an input pattern to obtain a sequence of input feature vectors;
   (e) calculating a likelihood between the sequence of input feature vectors and each of the hidden Markov models as a probability of occurrence of the sequence of input feature vectors according to each hidden Markov model, said step of calculating a likelihood, when a hidden Markov model includes a common parameter of distribution in one of the dimensions of multi-dimensional continuous probability distribution in the hidden Markov model, including determining whether a probability calculation with respect to said common parameter of distribution has already been made, and if so, the probability calculation result is utilized, and if not, a probability calculation is conducted for obtaining likelihood and the probability calculation result corresponding to the common parameter of distribution in one of the dimensions of multi-dimensional continuous probability distribution is stored; and
   (f) outputting, as a recognition result, a recognition category corresponding to the hidden Markov model which provides the greatest likelihood.

2. The speech recognition method of claim 1 wherein said multi-dimensional continuous probability distribution is a normal distribution and mean values in each dimension which are elements of mean vectors defining said normal distribution are used as said common parameters.

3. The speech recognition method of claim 2 wherein variance values in each dimension which are elements of a diagonal covariance matrix defining said normal distributions are also used as said common parameters.

4. The speech recognition method of claim 1 wherein said multi-dimensional continuous probability distribution is a normal distribution and variance values in each dimension, which are elements of a diagonal covariance matrix defining said normal distribution, are used as said common parameters.

5. The speech recognition method of claim 1 wherein in step (c) similar ones of said Hidden Markov Models are tied across the similar Models, said multi-dimensional continuous probability distributions of similar states are tied across different ones of said Models, and said common parameters are tied across one-dimensional continuous distributions of different dimensions in said tied multi-dimensional continuous probability distribution.

6. The speech recognition method of claim 1 wherein in step (c) similar ones of said Hidden Markov Models are tied across the similar Models, said multi-dimensional continuous probability distributions of similar states are tied across different ones of said Models, similar basic distributions forming multi-dimensional continuous probability distributions of different states of said Models are tied across said different states, and said common parameters are tied across one-dimensional continuous distributions of different dimensions in said tied multi-dimensional continuous probability distribution.

7. The speech recognition method of claim 5 or 6 wherein said multi-dimensional continuous probability distribution is normal distribution and mean values in each dimension which are elements of mean vectors defining said normal distribution are used as said common parameters.

8. The speech recognition method of claim 7 wherein the step (c) the tying of said common parameter is performed by processing in which mean values of each dimension in mean vectors of distributions of each of those Hidden Markov Models across which said tying is carried out are scalar-quantized into a number smaller than the number of said dimensions, using the Euclidean distance as a metric therefor.

9. The speech recognition method of claim 5 or 6 wherein said multi-dimensional continuous probability distribution is a normal distribution and mean values and variance values in each dimension which define said normal distribution are both used as said common parameters.

10. The speech recognition method of claim 9 wherein in step (c) the tying of said common parameter is performed by processing in which, based on those of said Models across which said tying is carried out, mean values and variance values defining each one-dimensional continuous distribution are clustered, for each dimension, into a number smaller than the total number of said one-dimensional continuous distributions, and representative mean values and variance values of said cluster in said each dimension are used as common parameters in said each dimension.

11. The speech recognition method of claim 10 wherein, in step (c) based on those of said Models across which said tying is carried out, average inter-distribution distances of said one-dimensional continuous distributions in each dimension are calculated, the number of distributions to be represented in each dimension is determined so that the number of distributions increases with an increase in said distance, and the number of said clusters for each dimension are set equal to said number of distributions to be represented in said each dimension.

12. The speech recognition method of claim 1 wherein the number of said common parameters in said each dimension of said multi-dimensional continuous probability distribution is reduced with an increase in the amount of discrimination information in said each dimension.

13. The speech recognition method of any one of claims 2 to 6, or 12 wherein said input vector is speech feature parameter vector.

14. The speech recognition method of claim 13 wherein said speech feature parameter vector is cepstrum.

15. The speech recognition method of claim 1 or 2 wherein in step (c) said Hidden Markov Models are each corrected to fit adaptation data, and when said multi-dimensional continuous probability distribution partly having said common parameters is corrected by said correction of each Model, common parameters of multi-dimensional continuous probability distributions of all the other Models containing said common parameters are corrected simultaneously with said correction of said multi-dimensional continuous probability distribution.

* * * * *